United States Patent
Lee et al.

(10) Patent No.: US 9,497,687 B2
(45) Date of Patent: Nov. 15, 2016

(54) METHOD AND APPARATUS FOR PERFORMING ACCESS CLASS BARRING IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/414,046

(22) PCT Filed: Jul. 9, 2013

(86) PCT No.: PCT/KR2013/006100
§ 371 (c)(1),
(2) Date: Jan. 9, 2015

(87) PCT Pub. No.: WO2014/010919
PCT Pub. Date: Jan. 16, 2014

(65) Prior Publication Data
US 2015/0215843 A1    Jul. 30, 2015

Related U.S. Application Data

(60) Provisional application No. 61/669,678, filed on Jul. 10, 2012.

(51) Int. Cl.
*H04W 48/02* (2009.01)
*H04W 8/18* (2009.01)
*H04W 48/12* (2009.01)

(52) U.S. Cl.
CPC ............. *H04W 48/02* (2013.01); *H04W 8/186* (2013.01); *H04W 48/12* (2013.01)

(58) Field of Classification Search
CPC ................. H04W 48/02; H04W 48/12; H04W 8/186
See application file for complete search history.

(56) References Cited

U.S. PATENT DOCUMENTS

2009/0070694 A1    3/2009  Ore et al.
2009/0305699 A1*  12/2009  Deshpande ........... H04W 48/16
                                                                455/434
(Continued)

FOREIGN PATENT DOCUMENTS

EP          2 393 330 A1      12/2011
EP          2 398 266 A2      12/2011
KR    10-2012-0005476 A        1/2012

OTHER PUBLICATIONS

NTT Docomo, Inc., "Prioritised Access Control in Hybrid Cell," 3GPP TSG-RAN WG2 #67, Tdoc-R2-094946, Shenzhen, China, Aug. 24-28, 2009, pp. 1-3, XP-50352878A.

(Continued)

*Primary Examiner* — Andrew Lai
*Assistant Examiner* — M Mostazir Rahman
(74) *Attorney, Agent, or Firm* — Birch, Stewart, Kolasch & Birch, LLP (57) ABSTRACT

A method and apparatus of establishing a connection in a wireless communication system is provided. A user equipment (UE) receives first barring information for member UEs and second barring information for non-member UEs, determines whether the UE is able to access to a cell or not based on one of the first barring information and the second barring information according to whether the UE is either a member UE or a non-member UE, and transmits an access request if it is determined that the UE is able to access to the cell.

12 Claims, 6 Drawing Sheets

(56) References Cited

U.S. PATENT DOCUMENTS

| | | | |
|---|---|---|---|
| 2010/0240349 A1 | 9/2010 | Jung et al. | |
| 2012/0021743 A1 | 1/2012 | Filipovic et al. | |
| 2013/0051214 A1* | 2/2013 | Fong | H04W 24/10 370/216 |
| 2013/0122901 A1* | 5/2013 | Chen | H04W 48/06 455/434 |
| 2013/0273907 A1* | 10/2013 | Vikberg | H04W 48/02 455/426.1 |
| 2014/0171096 A1* | 6/2014 | Hwang | H04W 48/02 455/452.1 |

OTHER PUBLICATIONS

NTT Docomo, Inc., Access class barring in hybrid cell, R2-097008, 3GPP TSG-RAN WG2 #68, Jeju, Korea, Nov. 9-13, 2009 (http://www.3gpp.org/ftp/tsg_ran/WG2_RL2/TSGR2_68/docs/).

* cited by examiner

METHOD AND APPARATUS FOR PERFORMING ACCESS CLASS BARRING IN WIRELESS COMMUNICATION SYSTEM

CROSS REFERENCE TO RELATED APPLICATIONS

This application is the National Phase of PCT/KR2013/006100 filed on Jul. 9, 2013, which claims priority under 35 U.S.C. 119(e) to U.S. Provisional Application No. 61/669,678 filed on Jul. 10, 2012, all of which are hereby expressly incorporated by reference into the present application.

TECHNICAL FIELD

The present invention relates to wireless communications, and more particularly, to a method and apparatus for performing access class barring in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

In general, a home eNodeB (HeNB) has a low radio transmission output power compared to the BS owned by mobile communication service providers. Therefore, the service coverage provided by the HeNB is typically smaller than the service coverage provided by an eNB. Due to such characteristics, the cell provided by the HeNB is classified as a femto cell in contrast to a macro cell provided by the eNB from a standpoint of the service coverage. From a standpoint of provided services, when the HeNB provides those services only to a closed subscriber group (CSG), the cell provided by this HeNB is referred to as a CSG cell.

The CSG cell may be defined as a cell broadcasting a CSG indicator set to true and a specific CSG identity (ID). A user equipment (UE) may have a CSG list to which the UE itself belongs as a member thereof, and this CSG list may be changed by a request of the UE or a command of the network. This list is called as a CSG whitelist. Generally, one HeNB may support one CSG.

The HeNB may deliver the CSG ID of the CSG being supported by itself through system information, thereby allowing only the corresponding CSG member UE to be accessed. When a CSG cell is found by the UE, the UE may check which type of CSG is supported by this CSG cell by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG whitelist.

It is not always required for the HeNB to allow the CSG UE to be accessed. Based on a configuration setting of the HeNB, non-CSG member UE may be allowed to be accessed. The type of the UE allowed to be accessed may be changed based on the configuration setting of the HeNB. Here, the configuration setting denotes a setting of the access mode (or may be called as operation mode) of HeNB. The operation mode of HeNB can be divided into three types as follows based on to which type of the UE the HeNB provides a service.

1) Closed access mode: A mode in which services are provided to particular CSG members only. A cell operated by the closed access mode may be called a closed cell. The closed cell may perform access control, which is a process that checks whether a UE is allowed to access and to be granted services in the closed cell.

2) Open access mode: A mode in which services are provided without any restriction of particular CSG members like normal eNB. A HeNB provides a normal cell not a CSG cell. A cell operated by the open access mode may be called an open cell. For clarity, a macro cell is the open cell.

3) Hybrid access mode: A mode in which CSG services are provided to particular CSG members and also services are provided to non-CSG members like a normal cell. A CSG cell operated by the hybrid access mode is called a hybrid cell. The hybrid cell may be defined as a cell broadcasting a CSG indicator set to false and a specific CSG identity. This cell is accessible as a CSG cell by UEs which are members of the CSG cell and as a normal cell by all other UEs. The hybrid cell may check whether a UE is a member or non-member of the hybrid cell. This process may be referred as membership verification. That is, the hybrid cell is considered as an open cell to non-member UEs, while it is considered as a CSG cell to member UEs. Even though member and non-member UEs can access to the hybrid cell, services provided to UEs could be differentiated between the member UEs and the non-member UEs. For instance, the member UEs may be granted with higher data rate than the non-member UEs. Namely, if UEs are connected to the hybrid cell, the hybrid cell would prioritize the member UEs than the non-member UEs.

Furthermore, CSG ID validation may be performed. The CSG ID validation is a process that checks whether the CSG ID received via handover messages is the same as the one broadcast by a target E-UTRAN.

When many UEs try to access to a hybrid cell, overload may occur at a hybrid cell. Accordingly, a method for controlling access to the hybrid cell may be required.

SUMMARY OF INVENTION

Technical Problem

The present invention provides a method and apparatus for performing access class barring in a wireless communication system. The present invention provides a method for performing access class barring based on membership of a user equipment (UE) for accessing to a hybrid cell.

Solution to Problem

In an aspect, a method of establishing, by a user equipment (UE), a connection in a wireless communication system is provided. The method includes receiving first barring information for member UEs and second barring information for non-member UEs, determining whether the UE is able to access to a cell or not based on one of the first barring information and the second barring information according to whether the UE is either a member UE or a non-member UE, and transmitting an access request if it is determined that the UE is able to access to the cell.

The member UEs may be members of a specific closed subscriber group (CSG), and the non-member UEs may be not members of the specific CSG.

The cell may be a hybrid cell.

The first barring information and the second barring information may be received via system information.

The first barring information and the second barring information may be received via a system information block type 2 (SIB2).

The first barring information and the second barring information may include different sets of equivalent parameters respectively.

Each set of equivalent parameters may include barring factor and barring time.

Whether the UE is able to access to the cell or not may be determined based on the first barring information if the UE is a member of a specific CSG.

Whether the UE is able to access to the cell or not may be determined based on the second barring information if the UE is not a member of a specific CSG.

Whether the UE is able to access to the cell or not may be determined when a radio resource control (RRC) connection establishment is initiated.

The access request may be an RRC connection request.

The access request may include a CSG membership status of the UE.

In another aspect, a user equipment (UE) in a wireless communication system is provided. The UE includes a radio frequency (RF) unit for transmitting or receiving a radio signal, and a processor coupled to the RF unit and configured for receiving first barring information for member UEs and second barring information for non-member UEs, determining whether the UE is able to access to a cell or not based on one of the first barring information and the second barring information according to whether the UE is either a member UE or a non-member UE, and transmitting an access request if it is determined that the UE is able to access to the cell.

Advantageous Effects of Invention

An eNodeB (eNB) can prioritize member UEs of a hybrid cell for admission control, and overload at the hybrid cell can be reduced.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
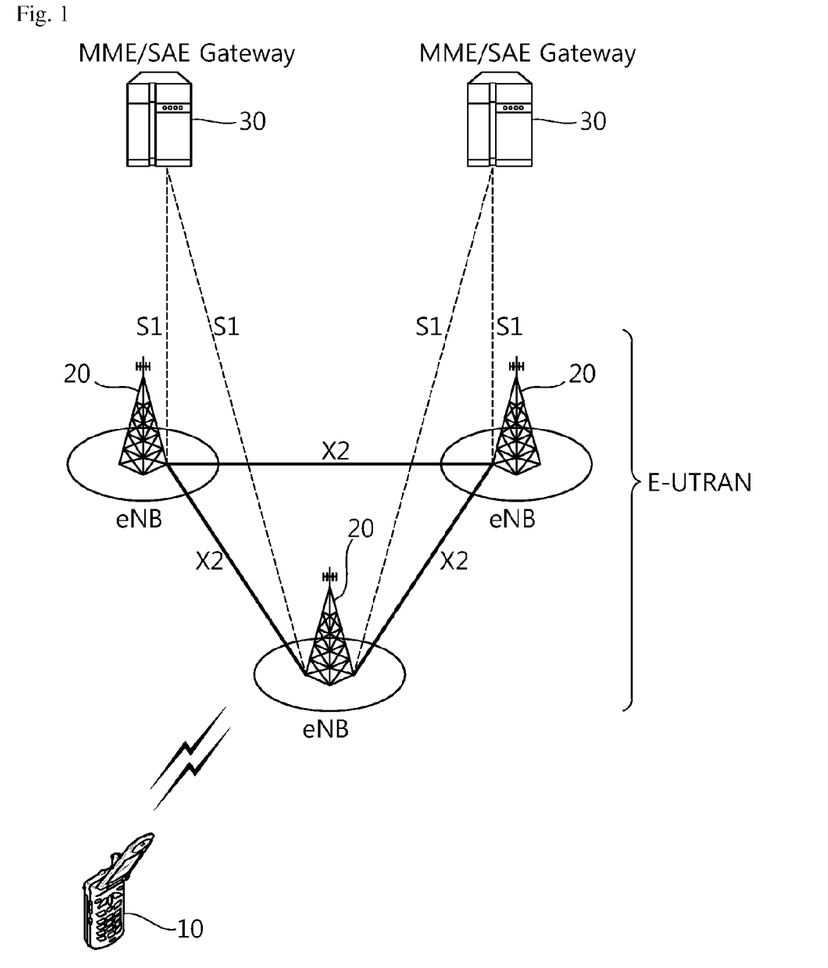
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
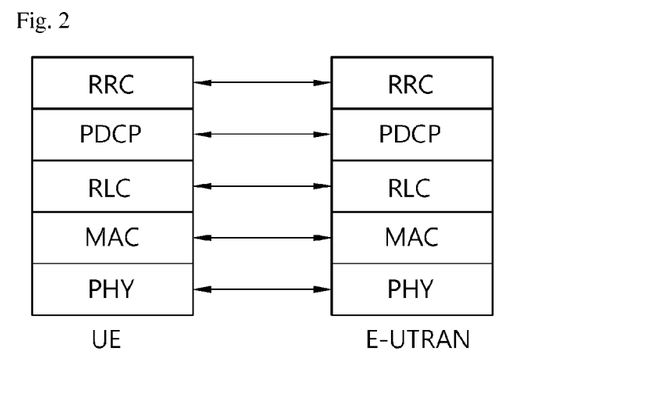
FIG. 2 is a diagram showing radio interface protocol architecture for a control plane.
Figure 3:
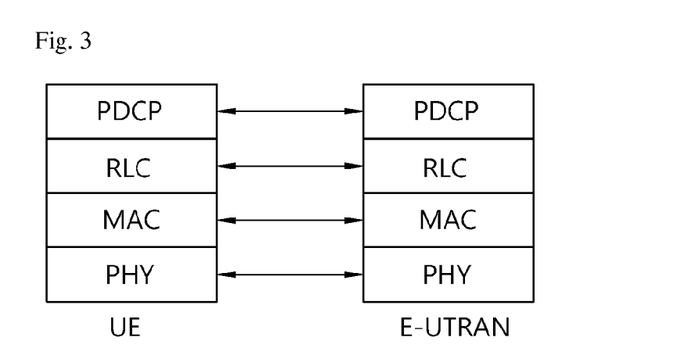
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
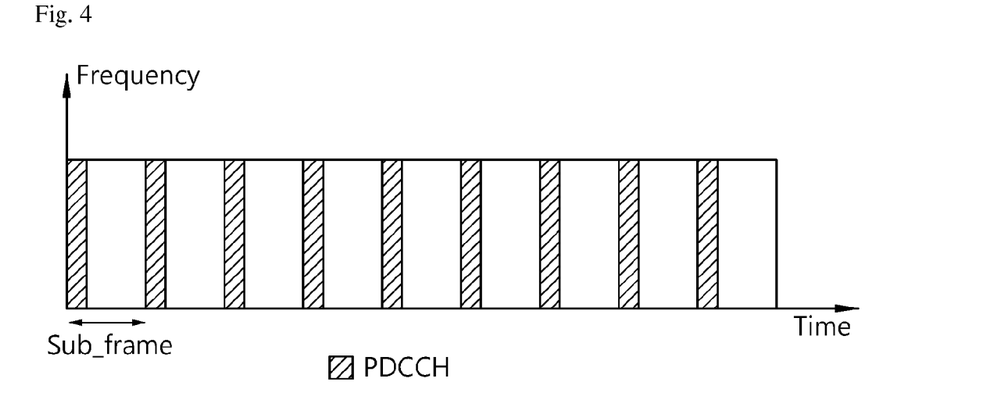
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

Figure 5:
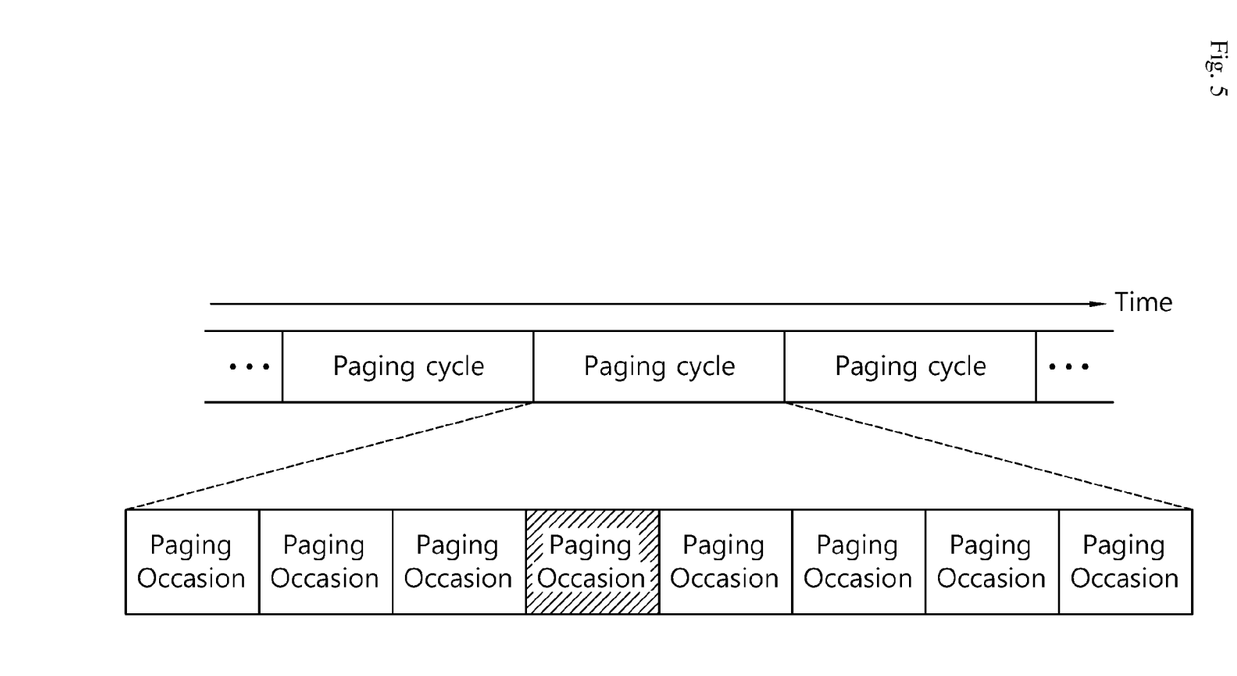
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

System information is described below. It may be referred to Section 5.2 of 3GPP TS 36.331 V11.0.0 (2012 June).

System information is divided into a MasterInformationBlock (MIB) and a number of SystemInformationBlocks (SIBs). The MIB defines the most essential physical layer information of a cell required to receive further system information. SystemInformationBlockType1 contains information relevant when evaluating if a UE is allowed to access a cell and defines scheduling of other SIBs. Other SIBs are sets of related system information. For example, a specific SIB may include only information of a neighbor cell, and another SIB may include only information of an uplink radio channel used by the UE.

The MIB is mapped on a BCCH and carried on a BCH while all SIBs are mapped on the BCCH and dynamically carried on a DL-SCH where they can be identified through an SI-RNTI (system information radio network temporary identifier). The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of the SystemInformationBlockType1 is scheduled in subframe #5 of radio frames for which the SFN mod 8=0, and repetitions are scheduled in subframe #5 of all other radio frames for which SFN mod 2=0. A single SI-RNTI is used to address the SystemInformationBlockType1 as well as all other SIBs. The SystemInformationBlockType1 configures an SI-window length and the transmission periodicity for all other SIBs.

Scheduling of all other SIBs is flexible and indicated by the SystemInformationBlockType1. The SIBs are transmitted within periodically occurring SI-windows using dynamic scheduling. Each SIB is associated with a SI-window, and SI-windows of different SIBs do not overlap. That is, within one SI-window only the corresponding SIB is transmitted. The length of the SI-window is common for all SIBs, and is configurable. Within the SI-window, the corresponding SIB can be transmitted a number of times in any subframe other than Multicast-Broadcast Single Frequency Network (MBSFN) subframes, uplink subframes in time domain duplex (TDD), and subframe #5 of radio frames for which SFN mod 2=0. The UE acquires the detailed time-domain scheduling (and other rmation, e.g. frequency-domain scheduling, used transport format) from decoding an SI-RNTI on a PDCCH.

The eNB may schedule DL-SCH transmissions concerning logical channels other than BCCH in the same subframe as used for the BCCH. The minimum UE capability restricts the BCCH mapped to DL-SCH e.g. regarding the maximum rate. System information may also be provided to the UE by means of dedicated signaling e.g. upon handover.

Cell selection/reselection to CSG cells is described below. Cell selection/reselection to CSG cells may be based on a UE autonomous search function. The search function may determine itself when/where to search, and need not be assisted by a network with information about frequencies which are dedicated to the CSG cells.

To assist the search function on mixed carriers, all CSG cells on mixed carriers may broadcast in system information a range of physical cell identity (PCI) values reserved by the network for use by CSG cells. Optionally, non-CSG cells on the mixed carrier may also transmit this information in the system information. The range of PCI values reserved may be only applicable to the frequency of a public land mobile network (PLMN) where a UE received this information. The UE may consider the last received reserved range of PCI values for CSG cells to be valid for a maximum of 24 hours within the entire PLMN. UE's use of the received PCI split information may be UE implementation dependent.

The UE checks suitability of CSG cells (identified by the 1 bit CSG indicator) based on a CSG whitelist in the UE (provided by upper layers). A CSG cell is only suitable for a UE if it belongs to its CSG whitelist.

The automated searching for CSG cells by the UE may be disabled by the search function, if the CSG whitelist configured in the UE is empty.

In addition, manual selection of CSG cells may be supported.

Cell selection/reselection to CSG cells may not require the network to provide neighbor cell information to the UE. The neighbor cell information may be provided to help the UE in specific cases, e.g. where the network wishes to trigger the UE to search for CSG cells.

Cell reselection between allowed CSG cells may be based on normal cell reselection procedure.

More specifically, a HeNB notifies a UE that a cell being serviced by itself is a CSG cell or a normal cell, allowing the UE to know whether or not it can be accessed to the corresponding cell. The HeNB being operated by a closed access mode broadcasts via system information that it is a CSG cell. In this manner, the HeNB allows the system information to include a CSG indicator, which has a size of 1 bit, indicating whether or not the cell being serviced by itself is a CSG cell in the system information. For example, the CSG cell broadcasts by setting the CSG indicator to 'TRUE'. If the cell being serviced is not a CSG cell, then the CSG indicator may be set to 'FALSE' or the transmission of the CSG indicator may be omitted. The UE shall distinguish a normal cell from a CSG cell, and thus a normal BS may also transmit the CSG indicator (for example, the CSG indicator set to 'FALSE'), thereby allowing the UE to know that the cell type provided by itself is a normal cell. Furthermore, the normal BS may not transmit the CSG indicator, thereby allowing the UE to know that the cell type provided by itself is a normal cell, too.

Table 1 shows CSG-related parameters transmitted by the corresponding cell, included in the system information, for each cell type.

TABLE 1

|  | CSG Cell | Typical Cell |
| --- | --- | --- |
| CSG Indicator | 'CSG Cell' is indicated | 'Non-CSG cell' is indicated, or not transmitted |

TABLE 1-continued

| | CSG Cell | Typical Cell |
|---|---|---|
| CSG ID | Supported CSG ID is transmitted | Not transmitted |

Table 2 shows types of the UE allowed to be accessed for each cell type.

TABLE 2

| | CSG Cell | Typical Cell |
|---|---|---|
| UE not supporting CSG | Access denied | Access accepted |
| Non-CSG member UE | Access denied | Access accepted |
| CSG member UE | Access accepted | Access accepted |

Figure 6:
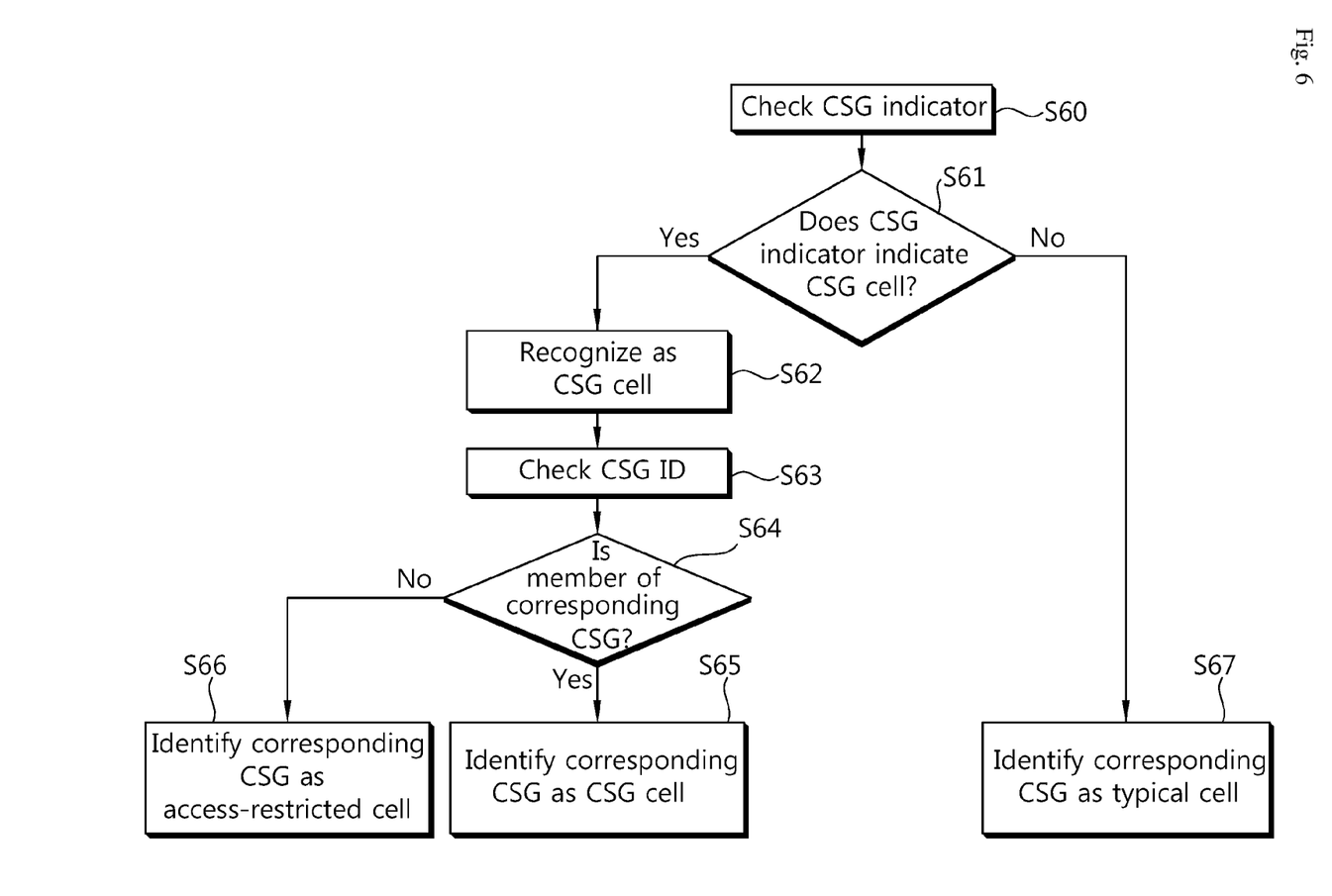
FIG. 6 shows an example of a method of checking an access mode of an eNB by a UE.

FIG. 6 shows an example of a method of checking an access mode of an eNB by a UE.

At step S60, the UE checks a CSG indicator in system information of a target cell in order to confirm which type the target cell is.

After checking the CSG indicator, the UE determines whether the CSG indicator indicates that the target cell is a CSG Cell at step S61. If the CSG indicator indicates that the target cell is a CSG cell, then the UE recognizes the corresponding cell as the CSG cell at step S62.

At step S63, the UE checks the CSG ID in the system information in order to check whether or not the UE itself is a CSG member of the target cell. At step S64, the UE determines whether the UE is a member of the corresponding CSG cell. If it is checked from the CSG ID that the UE is a CSG member of the target cell, then the corresponding cell will be recognized as an accessible CSG cell at step S65. If it is checked from the CSG ID that the UE is not a CSG member of the target cell, then the corresponding cell will be recognized as an inaccessible CSG cell at step S66.

If the CSG indicator indicates that the target cell is not a CSG cell at step S61, then the UE recognizes the target cell as a normal cell at step S67. Furthermore, if the CSG indicator is not transmitted at step S60, the UE recognizes the target cell as a normal cell.

A CSG cell is a cell for providing better-quality services, i.e., CSG services, to its member UEs. Since the UE may be typically serviced with better quality of service (QoS) in a CSG cell than in non-CSG cell, when the UE camps on the CSG cell, the selection of another cell may not be appropriate in terms of QoS even if an inter-frequency of a higher priority than a serving frequency is found.

In order to prevent a cell at an inter-frequency of a higher priority than a serving frequency from being selected over a serving CSG cell during the cell reselection procedure, a UE may assume the serving frequency to have the highest priority of all other frequencies as long as the serving CSG cell is evaluated as the best-ranked cell on the corresponding frequency. When the UE gives the highest priority to a specific frequency without any explicit network signaling, this frequency priority may be called an implicit highest priority. In this manner, it is possible to help the UE camp on the CSG cell as much as possible without violating the existing cell reselection rule that cell reselection is performed based on the priorities of frequencies.

Figure 7:
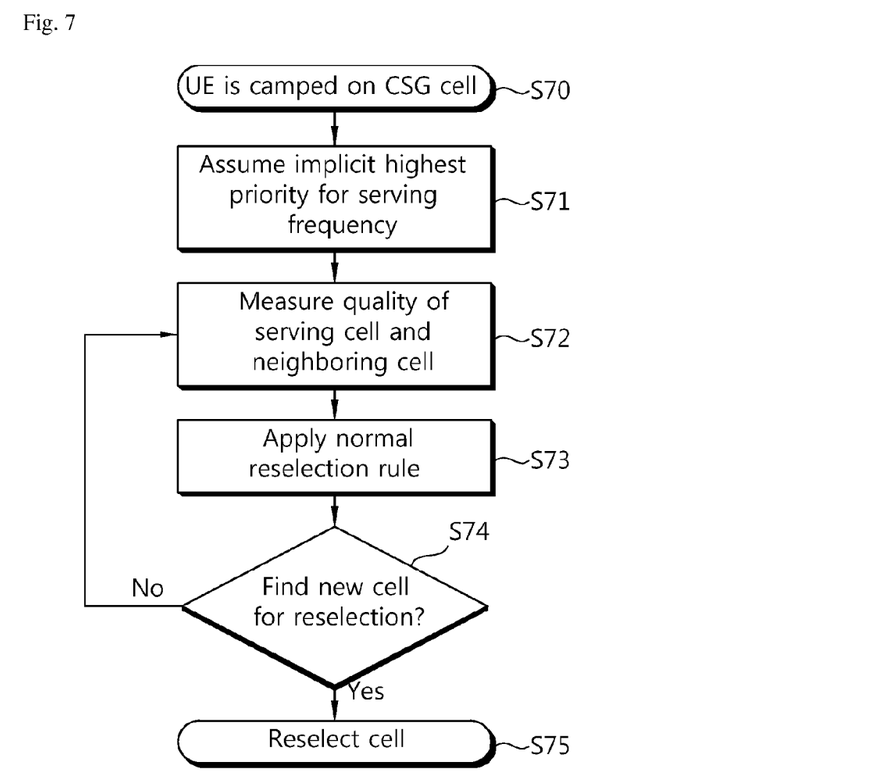
FIG. 7 shows an example of a cell reselection procedure when a UE camps on a CSG cell.

FIG. 7 shows an example of a cell reselection procedure when a UE camps on a CSG cell.

At step S70, a UE camps on a CSG cell.

Since a serving cell of the UE is the CSG cell, an implicit highest priority is assigned to a serving frequency at step S71.

At step S72, the UE measures the quality of the serving CSG cell and a neighboring cell.

At step S73, the UE applies a normal reselection rule based on the measurement results performed at step S72. More specifically, the UE may search a best ranked cell in a frequency of a higher priority than the serving frequency. If no best-ranked cell is found from the frequency of a higher priority than the serving frequency, the UE may search the best ranked cell in a frequency having the same priority as that of the serving frequency. If no best-ranked cell is found from the frequency having the same priority as that of the serving frequency, the UE may search the best ranked cell in a frequency of a lower priority than the serving frequency.

If a new cell is found at step S74, the UE reselects the new cell at step S75. If a new cell is not found at step S74, the UE measures the quality of the serving CSG cell and a neighboring cell again.

If the reselected cell is a non-CSG cell, the UE may withdraw the implicit highest priority assigned to the serving CSG cell, and may use frequency priorities provided by a network for cell reselection.

If the UE finds a new best-ranked CSG cell from a frequency having the same priority as that of the serving frequency, the UE may decide whether to stay in the current serving CSG cell or reselect the new best-ranked CSG cell according to an implementation of the UE.

Access class barring (ACB) is described below.

When non-access stratum (NAS) of a UE requests an RRC connection, an RRC layer of the UE may perform access class barring, and only if the access class barring is satisfied, the RRC layer of the UE may transmit an RRC connection request message to an eNB through random access. To perform the access class barring, the RRC layer of the UE may obtain access class barring information through system information broadcast by a cell. The access class barring information may include different barring time and different barring factor for different RRC establishment causes.

The NAS of the UE notifies the RRC layer of the UE of an RRC establishment cause when requesting an RRC connection. The RRC layer of the UE performs the access class barring using barring time and barring factor corresponding to the received RRC establishment cause. The RRC layer of the UE generates a random number, and determines whether to perform the access class barring according to whether the generated random number is greater or lower than the barring factor. When it is determined that the access class barring is performed, the UE prohibits transmission of an RRC connection request during the barring time.

The access class barring information may be included in a system information block type 2 (SIB2). The SIB2 contains radio resource configuration rmation that is common for all UEs. Table 3 shows a SIB2 information element including the access class barring information.

TABLE 3

-- ASN1START
SystemInformationBlockType2 ::= SEQUENCE {
ac-BarringInfo SEQUENCE {
ac-BarringForEmergency BOOLEAN,
ac-BarringForMO-Signalling AC-BarringConfig OPTIONAL, -- Need OP
ac-BarringForMO-Data AC-BarringConfig OPTIONAL -- Need OP TABLE 3-continued

```
} OPTIONAL, -- Need OP
...
}
AC-BarringConfig ::= SEQUENCE {
ac-BarringFactor ENUMERATED {
p00, p05, p10, p15, p20, p25, p30, p40,
p50, p60, p70, p75, p80, p85, p90, p95},
ac-BarringTime ENUMERATED {s4, s8, s16, s32, s64, s128, s256,
s512},
ac-BarringForSpecialAC BIT STRING (SIZE(5))
}
...
-- ASN1STOP
```

Referring to Table 3, the access class barring information includes access class barring information for mobile originating signaling (ac-BarringForMO-Signalling) and access class barring information for mobile originating calls (ac-BarringForMO-Data). Each access class barring information includes barring factor (ac-BarringFactor) and barring time (ac-BarringTime). For the barring factor, if a random number drawn by the UE is lower than the barring factor, access may be allowed. Otherwise the access may be barred. The barring factor is interpreted in the range [0,1): p00=0, p05=0.05, p10=0.10, . . . , p95=0.95. The barring time means access barring time value in seconds.

Access barring may be performed as follows. It is referred to Section 5.3.3.11 of 3GPP TS 36.331 V10.5.0 (2012 March).

1> if timer T302 or "Tbarring" is running:
2> consider access to the cell as barred;
1> else if SystemInformationBlockType2 includes "AC barring parameter":
2> if the UE has one or more Access Classes, as stored on the USIM, with a value in the range 11 . . . 15, which is valid for the UE to use according to TS 22.011 [10] and TS 23.122 [11], and
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in"AC barring parameter": "Tbarring"=(0.7+0.6*rand)*ac-BarringTime.

When overload occurs, an eNB may perform access class barring to control the number of RRC connection establishments. According to the prior art, when overload occurs at a hybrid cell, an eNB may prevent some UEs from accessing to the cell or rejecting requests of RRC connection establishments from some UEs. However, the eNB cannot differentiate accesses from member UEs and non-member UEs of the hybrid cell. Thus, the eNB cannot prioritize member UEs of the hybrid cell for admission control.

Accordingly, a method for performing access class barring based on membership of a UE for accessing to a hybrid cell may be proposed. According to embodiments of the present invention, the UE camps on a cell, and receives access information from the cell. The access information consists of a first access parameter assigned to member UEs and a second access parameter assigned to non-member UEs. The UE selects one of the first access parameter and the second access parameter according to UE's membership status, and determines whether or not the cell is barred according to the selected access parameter. If the cell is not barred, the UE requests a connection establishment to the cell. The cell may be a hybrid cell. The member UEs may be members of a specific CSG and the non-member UEs may not be members of the specific CSG. The access parameter may be an access class barring parameter which is broadcast via system information on a BCCH. The UE may determine whether or not the cell is barred when an RRC connection establishment is initiated. In addition, the UE may indicate to the cell whether or not the UE is a member of the cell via an RRC connection request message or an RRC connection setup complete message.

Figure 8:
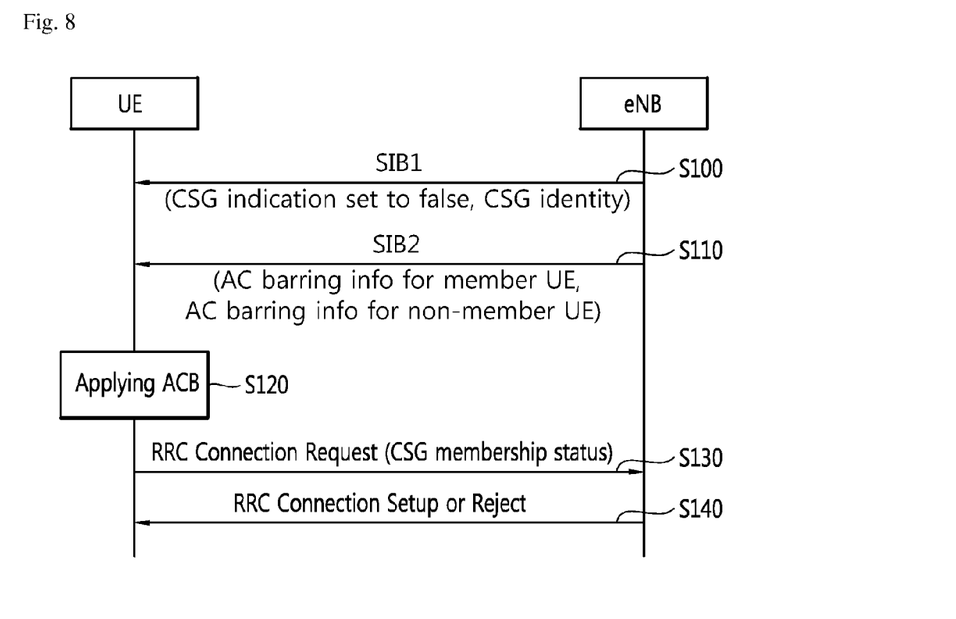
FIG. 8 shows an example of a method for performing access class barring according to an embodiment of the present invention.

FIG. 8 shows an example of a method for performing access class barring according to an embodiment of the present invention.

At step S100, a UE camps on a hybrid cell and then receives a SIB1 from the cell. The SIB1 contains CSG indication set to false and CSG identity. If the CSG indication is set to false but CSG identity is present in the SIB1, the UE considers this cell as a hybrid cell.

At step S110, the UE receives a SIB2 based on scheduling information included in the SIB1. The SIB2 contains access barring information which is used for access class barring. If the cell is a hybrid cell, the cell provides first access barring information assigned to member UEs and second access barring information assigned to non-member UEs. The UE may acquire the first access barring information for member UEs and the second access barring information for non-member UEs from the SIB2. In this case, the member UEs may be members of a CSG identified by the CSG identity of this cell. Non-member UEs may be not members of the CSG.

The first access barring information for member UEs and the second access barring information for non-member UEs may have two different sets of equivalent parameters. That is, each access barring information may be configured independently, and may include different sets of equivalent parameters described in Table 3. The first access barring information includes access class barring information for mobile originating signaling (ac-BarringForMO-Signalling) and access class barring information for mobile originating calls (ac-BarringForMO-Data). Each access class barring information includes barring factor (ac-BarringFactor) and barring time (ac-BarringTime). Likewise, the second access barring information includes access class barring information for mobile originating signaling (ac-BarringForMO-Signalling) and access class barring information for mobile originating calls (ac-BarringForMO-Data). Each access class barring information includes barring factor (ac-BarringFactor) and barring time (ac-BarringTime).

Upon request of RRC connection establishment from a NAS layer of the UE, at step S120, an RRC layer of the UE applies access class barring. If the UE is a member of the CSG, the UE applies the access class barring based on the first access barring information for member UEs. If the UE is not a member of the CSG, UE applies the access class barring based on the second access barring information for non-member UEs. The access class barring may be applied as described above.

As a result of the access class barring, the UE considered this cell as barred or not barred. If the cell is barred, the cell is barred until barring time is expired or cell reselection occurs.

If the cell is not barred, at step S130, UE transmits an RRC connection request message to the cell by initiating random access procedure. The RRC connection request message may include a CSG membership status of the UE that indicates whether or not UE is a member of the CSG. Even if the cell is barred, the UE may transmit the RRC connection request message, e.g., in case of emergency call.

At step S140, Upon reception of the RRC connection request message, if the CSG membership status is included in the RRC connection request message, the eNB performs admission control based on the received CSG membership status. For instance, when overload occurs, if the CSG membership status indicates that the UE is not a member of the CSG, the eNB may transmit an RRC connection reject message to the UE. But, if the CSG membership status indicates that the UE is a member of the CSG, the eNB may transmit an RRC connection setup message to the UE.

The UE may include the CSG membership status in the RRC connection setup complete message instead of the RRC connection request message. In this case, eNB may transmit an RRC connection release message to the UE that is not a member of the CSG.

Figure 9:
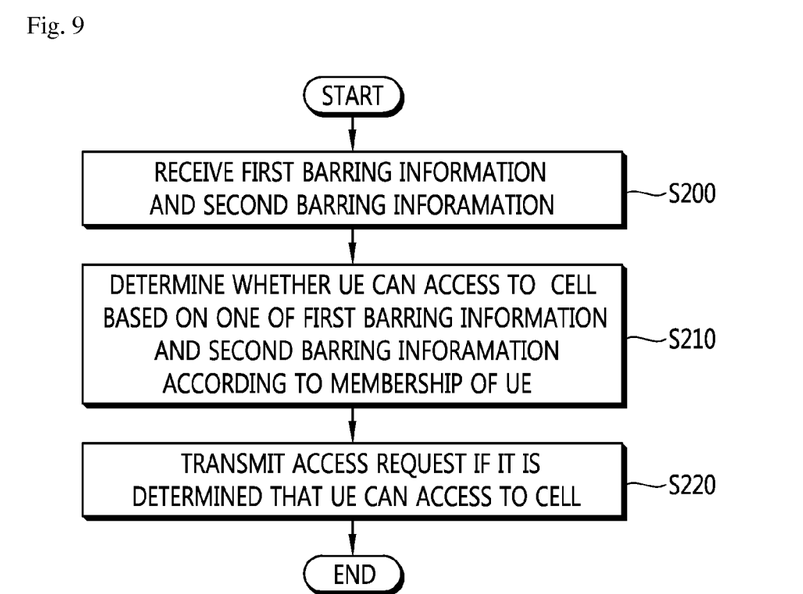
FIG. 9 shows another example of a method for performing access class barring according to an embodiment of the present invention.

FIG. 9 shows another example of a method for performing access class barring according to an embodiment of the present invention.

At step S200, a UE receives first barring information for member UEs and second barring information for non-member UEs. The first barring information and the second barring information may be received via system information, more specifically, a system information block type 2 (SIB2). The first barring information and the second barring information may include different sets of equivalent parameters respectively, and each set of equivalent parameters includes barring factor and barring time.

At step S210, the UE determines whether the UE is able to access to a cell or not based on one of the first barring information and the second barring information according to whether the UE is either a member UE or a non-member UE. The cell may be a hybrid cell. If the UE is a member of a specific CSG, the UE is able to access to the cell or not may be determined based on the first barring information. If the UE is not a member of a specific CSG, the UE is able to access to the cell or not may be determined based on the second barring information. In addition, this step may be performed when an RRC connection establishment is initiated.

If it is determined that the UE is able to access to the cell, at step S220, the UE transmits an access request. The access request may be an RRC connection request, and may include a CSG membership status of the UE.

Figure 10:
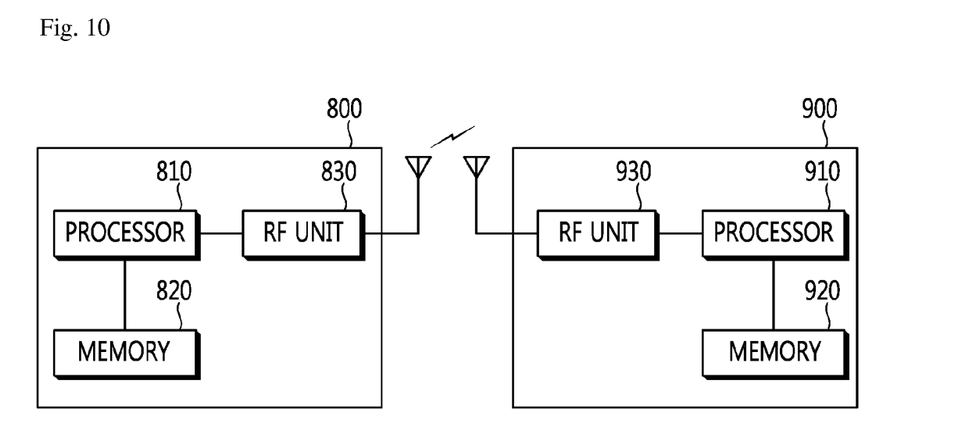
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of establishing, by a first user equipment (UE), a connection in a wireless communication system, the method comprising:
   receiving, by the first UE, cell type information via a system information block type 1 (SIB1),
   wherein the cell type information indicates that a closed subscriber group (CSG) indication is set to 'false' and that a CSG identity is present;
   receiving, by the first UE, first barring information for member UEs and second barring information for non-member UEs,
   wherein the member UEs are members of a specific CSG,
   wherein the non-member UEs are not members of the specific CSG,
   wherein the first barring information and the second barring information are received via system information block type 2 (SIB2),
   wherein the first barring information and the second barring information include two different sets of equivalent parameters, respectively, and
   wherein each set of the equivalent parameters includes a barring factor and a barring time;

determining, by the first UE, whether or not the first UE is able to access a cell based on one of the first barring information and the second barring information according to whether the first UE is a member UE or a non-member UE, wherein the cell is a hybrid cell; and transmitting, by the first UE, an access request if it is determined that the first UE is able to access the cell.

2. The method of claim 1, wherein whether or not the first UE is able to access the cell is determined based on the first barring information if the first UE is a member of a specific CSG.

3. The method of claim 1, wherein whether or not the first UE is able to access the cell is determined based on the second barring information if the first UE is not a member of a specific CSG.

4. The method of claim 1, wherein whether or not the first UE is able to access the cell is determined when a radio resource control (RRC) connection establishment is initiated.

5. The method of claim 1, wherein the access request is a radio resource control (RRC) connection request.

6. The method of claim 1, wherein the access request includes a CSG membership status of the first UE.

7. A first user equipment (UE) in a wireless communication system, the first UE comprising:

a radio frequency (RF) unit configured to transmit or receive a radio signal; and a processor operably coupled to the RF unit and configured to:

receive cell type information via a system information block type 1 (SIB1), wherein the cell type information indicates that a closed subscriber group (CSG) indication is set to 'false' and that a CSG identity is present;

receive first barring information for member UEs and second barring information for non-member UEs, wherein the member UEs are members of a specific CSG, wherein the non-member UEs are not members of the specific CSG, wherein the first barring information and the second barring information are received via system information block type 2 (SIB2), wherein the first barring information and the second barring information include two different sets of equivalent parameters, respectively, and wherein each set of the equivalent parameters includes a barring factor and a barring time;

determine whether or not the first UE is able to access a cell based on one of the first barring information and the second barring information according to whether the first UE is a member UE or a non-member UE, wherein the cell is a hybrid cell; and transmit an access request if it is determined that the first UE is able to access the cell.

8. The first UE of claim 7, wherein whether or not the first UE is able to access the cell is determined based on the first barring information if the first UE is a member of a specific CSG.

9. The first UE of claim 7, wherein whether or not the first UE is able to access the cell is determined based on the second barring information if the first UE is not a member of a specific CSG.

10. The first UE of claim 7, wherein whether or not the UE is able to access the cell is determined when a radio resource control (RRC) connection establishment is initiated.

11. The first UE of claim 7, wherein the access request is a radio resource control (RRC) connection request.

12. The first UE of claim 7, wherein the access request includes a CSG membership status of the first UE.

* * * * *